United States Patent [19]

Budert

[11] Patent Number: 5,425,519
[45] Date of Patent: Jun. 20, 1995

[54] HANGER FOR SELF-SERVICE SALES OF GOODS

[75] Inventor: Günter H. Budert, Bachhagel, Germany

[73] Assignee: Firma Georg Knoblauch, Giengen, Germany

[21] Appl. No.: 241,209

[22] Filed: May 10, 1994

[30] Foreign Application Priority Data

Jun. 29, 1993 [DE] Germany .................. 9309610 U

[51] Int. Cl.⁶ .................................................. A47B 96/06
[52] U.S. Cl. ...................................... 248/214; 40/606; 206/378; 248/317; 403/2; 403/319
[58] Field of Search .................. 248/214, 215, 216.1, 248/222.1, 223.3, 225.1, 225.2, 317, 686, 224.3, 314; 40/606, 653, 663; 206/376, 377, 378, 349; 403/2, 319, 315; 211/113

[56] References Cited

U.S. PATENT DOCUMENTS

| | | | |
|---|---|---|---|
| 3,604,565 | 9/1971 | Freeman | 248/314 |
| 3,664,617 | 5/1972 | Fenwick | 248/314 X |
| 4,667,913 | 5/1987 | Peelle et al. | 248/317 X |
| 5,249,771 | 11/1993 | Wear | 248/317 |

*Primary Examiner*—Ramon O. Ramirez
*Attorney, Agent, or Firm*—Herbert Dubno

[57] ABSTRACT

A hanger for articles having a rectangular recess, for example, sockets for a socket wrench, has a connecting element which entrains a locking element into the recess in the goods and ruptures a web connecting opposite bars of the locking element. When the hanger is withdrawn from the recess, the bars fall out and limit reuse of the hanger.

18 Claims, 2 Drawing Sheets

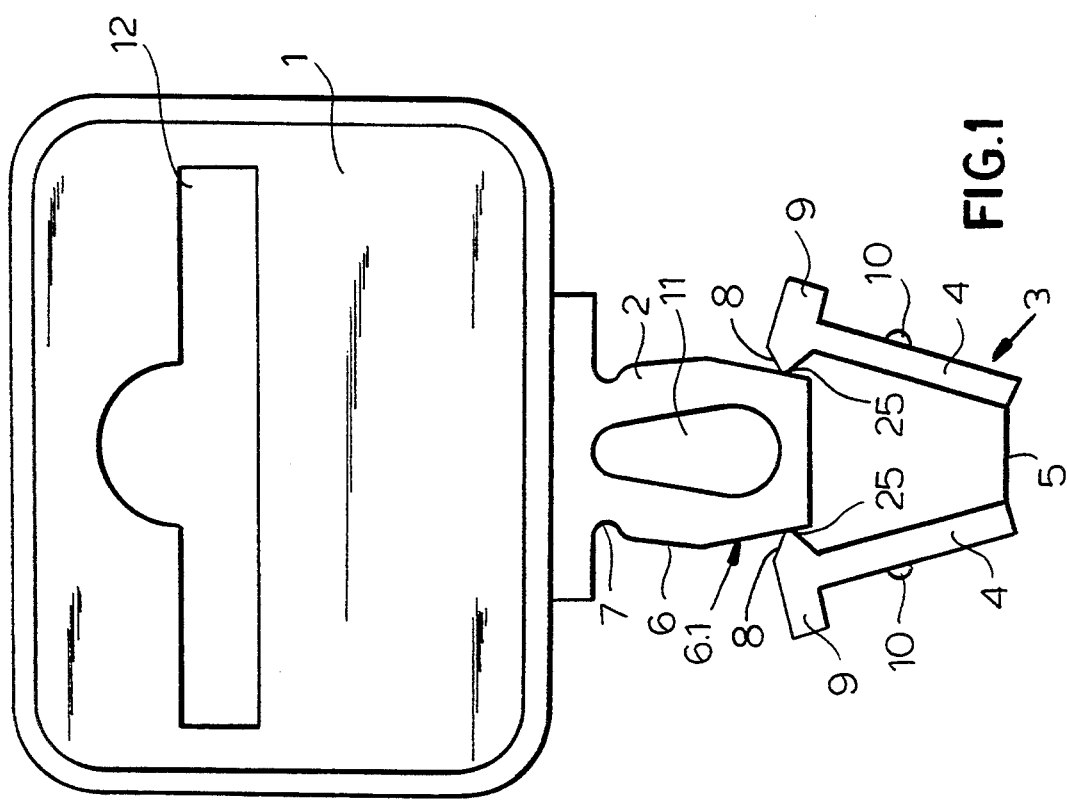

5,425,519

HANGER FOR SELF-SERVICE SALES OF GOODS

FIELD OF THE INVENTION

The present invention relates to a hanger and, more particularly, to a hanger for the display and vending of an article, generally a package for goods in self-service vending establishments, e.g. sockets and other attachments for socket wrenches, other tools and the like.

BACKGROUND OF THE INVENTION

A variety of products can be marketed without packaging by providing a hanger or the like which can be fitted to the article and utilized to suspend the article from a rack in a vending display, for example, in a self-service department or vending establishment. Such articles include tools like the sockets for a socket wrench in which the article has a hole or recess into which the hanger can be fitted. Hangers are also desirable for other articles including packages which are required to have indicia associated with them such as, for example, the price information, identifying information including size or quality, and the like.

In general, therefore, for self-service display and vending it may be desirable to provide a hanger which can be inserted into a recess in an article, e.g. a tool like a socket for a socket wrench, directly, or into a package which can have a recess receiving a connecting element of that hanger.

However, with such hangers as have been provided heretofore, it has been not possible in a simple and convenient manner to prevent exchange of the hanger on the article. The possibility of such exchange allows, for example, a person to replace a hanger bearing a higher price for a hanger bearing a lower price, thereby perpetrating a fraud upon the establishment.

OBJECTS OF THE INVENTION

It is, therefore, the principal object of the present invention to provide a hanger for the purposes described whereby the replacement of the hanger by another with different indicia is rendered difficult, if not impossible.

Another object of this invention is to provide a hanger for the purposes described which can be applied in a simple and rapid manner but which after removal from the article, cannot be applied to another article without substantial difficulty.

Still another object of this invention is to provide an improved hanger for articles such as tools, especially sockets for socket wrenches, whereby the display and marketing is enhanced and earlier drawbacks are avoided.

SUMMARY OF THE INVENTION

These objects and others which will become apparent hereinafter are attained, in accordance with the invention with a hanger which comprises a generally flat support, functioning as an indicia carrier, bearing the indicia associated with the product to be displayed and sold, e.g. sockets or a socket wrench or other tools. That support can be provided, in addition, with means for suspending the article and the hanger from a standard display rack or the like. According to the invention, the support is provided with a connecting element receivable in a recess in the article to be displayed, usually the socket or tool directly, but possibly also a package having a recess and accommodating one or more goods to be displayed, the recess having a pair of flanks juxtaposed with opposite sides of the connecting element.

According to the invention, moreover, along these opposite sides, opposite bars of a locking element engage, the bars having an orientation such that they converge in the direction of insertion of the connecting element and the locking element jointly into the recess of the article whereby a locking element is spread apart to rupture a ligature, web or strand interconnecting the bars.

Upon rupturing of the strand, the bars can be forced apart to lie between the sides of the connecting element and the flanks of the recess of the article and thus retain the connecting element in the recess. For that purpose, mating formations on the bars and the connecting element engage the bars in the connecting element. The bars thus function as spacers between the connecting element and the flanks of the recess as well as the means for retaining the connecting element in the recess.

Upon withdrawal of the connecting element from the recess, the now-separated bars are also extracted because of their engagement with the connecting element, the bars being then free to detach from the connecting element.

Since reinsertion of the separated bars with a connecting element of a hanger into, say, another socket or article is practically impossible for one person alone to manage, the system of the invention provides security against exchange of the hangers.

The invention has the advantage that the connecting element together with the locking element can be inserted readily in the recess by reason of the wedge-shaped taper of the bars of the locking element prior to rupture of the ligature, but after the simple and rapid insertion, because of the rupture, the bars provide security against reinsertion of the connecting element of a hanger which has been separated from its article.

To facilitate the insertion of the connecting element together with the locking element engaging around at least the leading end thereof, I provide that the sides of the connecting element turned away from the support, converge toward one another to form wedging surfaces capable of pressing the bars apart.

The locking means between the bars and the connecting element can include grooves in the opposite sides of the connecting element proximal to the support and respective projections on the bars. The grooves are located on the connecting element such that they receive the projections practically only when the connecting element has been fully inserted into the recess.

It has also been found to be advantageous to provide the bars with abutments extending outwardly at their ends proximal to the support of the indicia carrier for engagement with edges of the article adjacent the recess.

The rupturable strand or ligature, according to the invention, is advantageously provided at the ends of the bars remote from the support and thus at the portions of the bars having the greatest excursion upon separation of the ligature.

According to still another feature of the invention, the bars can have, along their outer sides, respective projections engageable in recesses in the flanks of the article. Additionally, the connecting element can be formed with a throughgoing opening or passage between the opposite sides which is parallel to those opposite sides or the surfaces thereof to impart elasticity to the bars.

An especially simple insertion of the assembly is possible when the connecting element and the clamping element are injection molded as in one piece and are interconnecting at intentional break points. The opening in the support or indicia carrier to fit standard display racks and the like can be configured in the shape required for SB racks and the like. More particularly, a hanger, especially for self-service vending, of an article having a recess opening at the edge of the article can comprise:

an indicia carrier formed with a support and a connecting element projecting from the support and receivable with clearance between the flanks in the recess, the support being formed with means for suspending the carrier and the article for vending and display; and a locking element formed with two clamping bars disposed on opposite sides of the connecting element and positioned to be received between the connecting element and respective ones of the flanks upon insertion of the locking element together with the connecting element into the recess, the bars converging in a direction of the insertion and being interconnected at locations thereof spaced from the connecting element by a rupturable strand tearing upon spreading of the ends as the locking element and the connecting element are forced into the recess, the clamping bars and lateral surfaces of the connecting element being formed with mutually engaging detent formations entraining the bars with the connecting element, whereby upon withdrawal of the connecting element from the recess, the bars are entrained out of the recess by the connecting element and fall free.

BRIEF DESCRIPTION OF THE DRAWING

The above and other objects, features, and advantages will become more readily apparent from the following description, reference being made to the accompanying drawing in which:

FIG. 1 is an elevational view of the hanger prior to insertion into an article;

FIG. 2 is a cross sectional view through the hanger;

SPECIFIC DESCRIPTION

Figure 4:
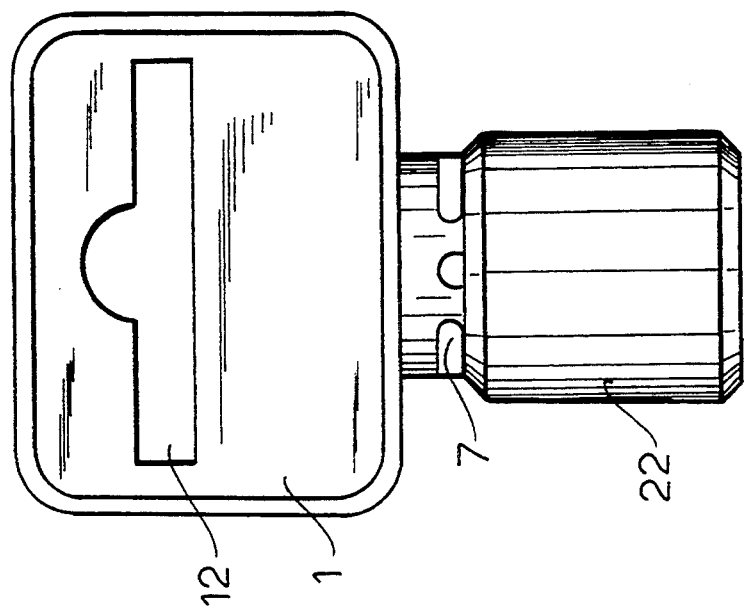
FIG. 4 is an elevational view of the hanger in place on an article, namely a wrench socket, for hanging from a display rack.
Figure 3:
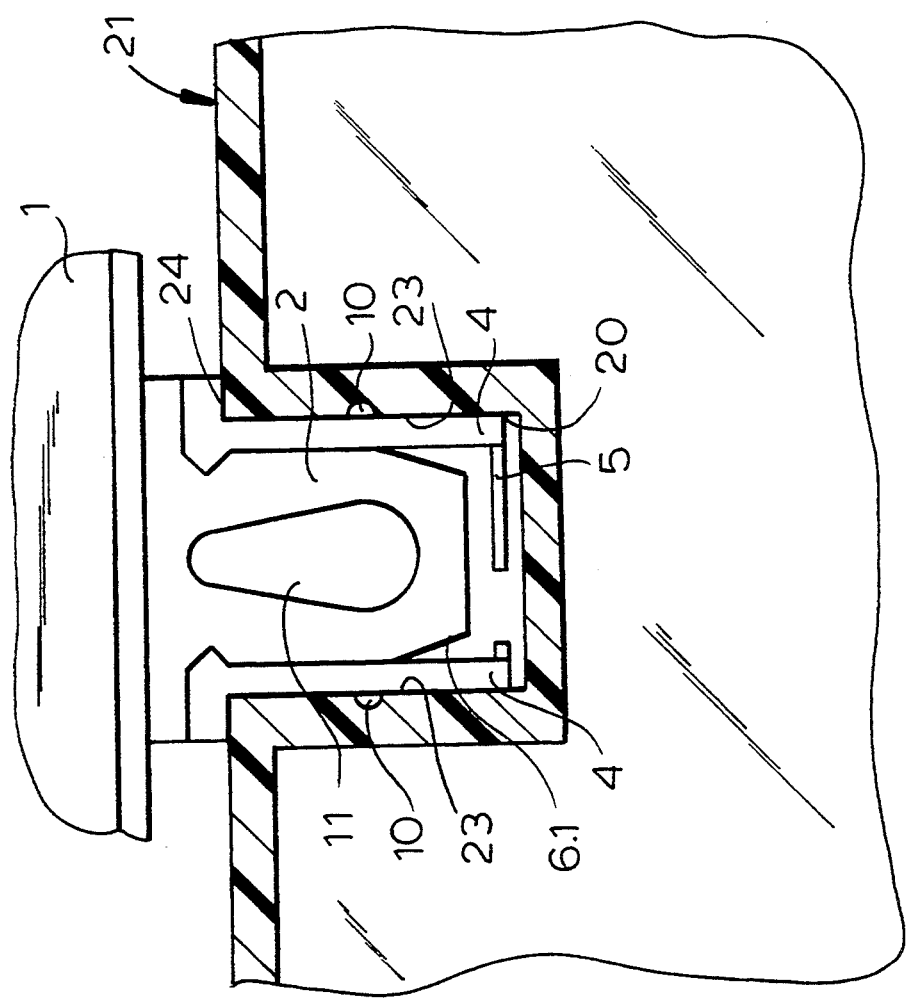
FIG. 3 is a cross sectional view showing the hanger inserted into an article following the rupture of the strand.

The hanger shown in the drawing is especially useful for self-service display and vending of goods and, in particular, can be inserted into a rectangular recess in an article, such as a tool, e.g. a socket for a socket wrench or the like having a square driver which normally fits into that recess.

The hanger comprises a flat indicia support 1 which can be provided with price data and is formed with a connecting element receivable in the recess of the article. The hanger also includes a locking element 3 which at least partly engages around the connecting element 2 and which is disposed ahead of the connecting element in its insertion into the recess.

The locking element 3 is formed from two clamping bars 4 which are interconnected via a rupturable strand, ligament or web 5, which may be injection molded in one piece with the locking element and is sufficiently thin to tear upon spreading of the bars.

The web 5 holds the bars 4 in a converging or wedge-shaped configuration tapering away from the support 1.

Upon insertion of the connecting element 2 together with the locking element 3 in a recess 20 of an article 21 which can be a socket 22 of a socket wrench (see FIG. 4), the bars 4 are spread apart, tearing the web 5 and lie between the sides 6 of the connecting element 2 and the flanks 23 of the recess 20.

Upon withdrawal of the connecting element 2 from the socket 22, therefore, the bars 4 will fall out and a new insertion of the hanger into the goods is thereby made difficult if not impossible.

To provide a sufficient retention between the connecting element 2 and the clamping bars 4 in the recess, the clamping bar 4 and the side 6 of the connecting element are provided with mutually-engaging locking formations.

The two sides 6 of the connecting element 2 converge toward the free end of the connecting element at inclined surfaces or ramps 6.1 which form camming surfaces tending to spread the bars 4 apart and facilitating pressing of the connecting element 2 into the recess.

The locking formations can include grooves 7 in the sides 6 of the connecting element 2 and inwardly-extending projections 8 on the bars 4. The grooves 7 are located at the end of the connecting element proximal to the support 1 so that the projections 8 will engage in the grooves 7 only when the connecting element is fully inserted into the recess.

The clamping bars 4 are also provided at this end with outwardly-directed abutments 9 which engage the edge 24 of the article at which the recess opens so that the bars 4 are retained by the article as the clamping element 2 is inserted further into the recess to spread the bars 4 apart at their free ends and rupture the web 5.

The web 5 is provided at the free end of the bars remote from the support 1 since these portions of the bars have the greatest excursion upon spreading thereof with insertion of the hanger into the goods. The clamping bars 4 may have projections 10 on their outer surfaces which can engage in detent recesses normally provided in the flanks of the recess of a socket to further increase the retention of the hanger in the socket.

The connecting element 2 is provided with a through-going opening 11 parallel to the planes of the sides 6 of connecting element 2 to enhance the elastic deformability of the connecting element 2, thereby facilitating insertion of the hanger into the goods and, on the other hand, providing a high clamping force retaining the hanger on the goods.

The locking element 3 and the connecting element 2 can be injection molded in one piece with intentional break points at 25, if desired, to facilitate insertion into the recess. The opening 12 provided on the support 1 can be shaped to any standard self-service vending rack configuration.

In operation, the hanger is inserted into the goods and bears the price and other indicia thereof. The hanger remains in the goods until after sale. If the user and purchaser then remove the hanger, the bars 4 fall out and prevent the user from readily inserting the hanger into another socket or like article.

I claim:

1. A hanger, especially for self-service vending, of an article having a recess opening at an edge of the article and formed with opposite flanks, said hanger comprising:

an indicia carrier formed with a support and a connecting element projecting from said support and receivable with clearance between said flanks in said recess, said support being formed with means for suspending said carrier and said article for vending and display; and a locking element formed with two clamping bars disposed on opposite sides of said connecting element and positioned to be received between said connecting element and respective ones of said flanks upon insertion of said locking element together with said connecting element into said recess, said bars converging in a direction of said insertion and being interconnected at locations thereof spaced from said connecting element by a rupturable strand tearing upon spreading of said ends as said locking element and said connecting element are forced into said recess, said clamping bars and lateral surfaces of said connecting element being formed with mutually engaging detent formations entraining said bars with said connecting element, whereby upon withdrawal of said connecting element from said recess, said bars are entrained out of said recess by said connecting element and fall free.

2. The hanger defined in claim 1 wherein said sides of said connecting element are formed with wedging surfaces inclined toward one another in a direction of insertion of said connecting element into said recess for camming said bars apart.

3. The hanger defined in claim 2 wherein said formations include a respective groove formed in each of said sides of said connecting element and a respective inwardly extending projection formed on each of said bars and adapted to fit into the respective groove.

4. The hanger defined in claim 3 wherein each of said grooves is provided at an end of said connecting element close to said support.

5. The hanger defined in claim 4 wherein each of said bars is provided at an end turned toward said support with an abutment perpendicular to the respective bar and engageable by said edge of said article adjacent said recess.

6. The hanger defined in claim 5 wherein said rupturable strand connects ends of said bars turned away from said support.

7. The hanger defined in claim 6 wherein said bars are formed with outwardly projecting clamping protuberances engageable with said flanks.

8. The hanger defined in claim 7 wherein said connecting element is formed with an elongated through-going opening extending generally parallel to said surfaces of said sides.

9. The hanger defined in claim 8 wherein said connecting element and said locking element are in one injection molded piece and interconnected by intentional-break points separated upon insertion of said elements into said recess.

10. The hanger defined in claim 9 wherein said support has a window shaped to enable fitting of the hanger onto a standard-shape display rack.

11. The hanger defined in claim 1 wherein said formations include a respective groove formed in each of said sides of said connecting element and a respective inwardly extending projection formed on each of said bars and adapted to fit into the respective groove.

12. The hanger defined in claim 11 wherein each of said grooves is provided at an end of said connecting element close to said support.

13. The hanger defined in claim 1 wherein each of said bars is provided at an end turned toward said support with an abutment perpendicular to the respective bar and engageable by said edge of said article adjacent said recess.

14. The hanger defined in claim 1 wherein said rupturable strand connects ends of said bars turned away from said support.

15. The hanger defined in claim 1 wherein said bars are formed with outwardly projecting clamping protuberances engageable with said flanks.

16. The hanger defined in claim 1 wherein said connecting element is formed with an elongated through-going opening extending generally parallel to said surfaces of said sides.

17. The hanger defined in claim 1 wherein said connecting element and said locking element are in one injection molded piece and interconnected by intentional-break points separated upon insertion of said elements into said recess.

18. The hanger defined in claim 1 wherein said support has a window shaped to enable fitting of the hanger onto a standard-shape display rack.

* * * * *